United States Patent
Tada

(10) Patent No.: US 7,179,540 B2
(45) Date of Patent: Feb. 20, 2007

(54) PLATE TYPE HEAT EXCHANGER AND METHOD FOR MANUFACTURE THEREOF

(75) Inventor: Kaoru Tada, Isehara (JP)

(73) Assignees: Brazing Co., LTD., Kanagawa (JP); Fukuda Metal Foil & Power Co., LTD., Kyoto (JP)

( * ) Notice: Subject to any disclaimer, the term of this patent is extended or adjusted under 35 U.S.C. 154(b) by 278 days.

(21) Appl. No.: 10/451,618

(22) PCT Filed: Dec. 6, 2001

(86) PCT No.: PCT/JP01/10707

§ 371 (c)(1),
(2), (4) Date: Jun. 20, 2003

(87) PCT Pub. No.: WO02/053318

PCT Pub. Date: Jul. 11, 2002

(65) Prior Publication Data

US 2004/0072013 A1  Apr. 15, 2004

(30) Foreign Application Priority Data

Dec. 28, 2000  (JP) .............................. 2000-404993

(51) Int. Cl.
- *F28F 21/08* (2006.01)
- *C22C 19/05* (2006.01)
- *B23K 35/30* (2006.01)
- *B23K 101/14* (2006.01)

(52) U.S. Cl. .................. 428/679; 428/680; 428/685; 420/443; 420/445; 165/905; 228/248.1; 228/262.42

(58) Field of Classification Search ...................... None
See application file for complete search history.

(56) References Cited

U.S. PATENT DOCUMENTS

| 4,283,225 A | | 8/1981 | Sexton et al. |
| 4,522,859 A | * | 6/1985 | Blair ........................... 428/116 |
| 4,745,037 A | | 5/1988 | DeCristofaro et al. |
| 6,203,754 B1 | * | 3/2001 | Sugiyama .................... 420/442 |
| 6,696,017 B2 | * | 2/2004 | Nagai et al. ................. 420/442 |
| 2002/0085943 A1 | * | 7/2002 | Nagai et al. ................. 420/443 |

FOREIGN PATENT DOCUMENTS

| DE | 100 03 329 A1 | 8/2000 |
| EP | 0 531 775 A1 | 8/1992 |
| FR | 2 788 710 | 7/2000 |
| GB | 2 347 939 A | 9/2000 |
| JP | 9-225679 | 9/1997 |
| JP | 2000-171188 | 6/2000 |
| JP | 2000-190069 | 7/2000 |
| JP | 2000-218389 | 8/2000 |
| JP | 2000-218390 | 8/2000 |

* cited by examiner

*Primary Examiner*—John J. Zimmerman
(74) *Attorney, Agent, or Firm*—Kirschstein, et al.

(57) ABSTRACT

A plate type heat exchanger wherein contacting portions of laminated plural plates and fins or contacting portions of laminated plural plates are brazed to form a heat exchange area, characterized in that at least the surface of a plate or fin contacting with a fluid is covered with an alloy comprising in weight ratio 25–35% of chromium, 5–7% of phosphorus, 3–5% of silicon, 0.001–0.1% of at least one selected from the group consisting of aluminum, calcium, yttrium and mischmetal, and balance containing mainly nickel. The alloy may contain 15% or less of iron and or 10% or less of molybdenum.

The plate type exchanger exhibits enhanced pressure resistance and is excellent in corrosion resistance.

8 Claims, 1 Drawing Sheet

PLATE TYPE HEAT EXCHANGER AND METHOD FOR MANUFACTURE THEREOF

TECHNICAL FIELD

The present invention relates to a plate type heat exchanger which has a heat exchanging portion constituted by laminating plural plates with fins or a plural of plates and brazing them mutually, and a method for its preparation.

BACKGROUND ART

In a plate type heat exchanger, the heat exchanging portion is constituted, for example, by laminating alternately plates and fins and brazing the portions where each plates contact with fins. Also, it is possible to form uneven portions for stirring on the flat surface of a plate and thus to omit the fins. In this case, the contacting portion of each plates is brazed.

As the brazing filler metal used for brazing, brazing copper alloy which is rich in practical application in various fields has been widely used. However, in heat exchangers requiring high temperature characteristics and excellent corrosion resistance, brazing nickel alloy superior in these features to brazing copper alloy in general has come to be also used.

As brazing nickel alloy is poor in processability, when brazing nickel alloy in powder form is applied for a plate type heat exchanger, the brazing alloy powder is adhered on the brazing parts such as the convex portions or flange portions formed on the plate or on the plate surface contacting with the fins and it is heated to braze.

Heretofore, as methods for adhering the brazing alloy powder on such a plate surface, the following methods have been known; that a paste prepared by mixing previously a brazing filler metal with a liquid binder for fixing the brazing filler metal is adhered by screen printing, that a paste brazing filler metal is adhered by using a dispenser, and that a brazing filler metal and a binder are sprayed simultaneously and adhered. Also, as the binder, an aqueous binder has been widely used in consideration of safety and environmental problems.

Recently, a heat exchanger excellent in corrosion resistance and strength characteristics has come to be required for further improvement on reliability and hence a brazing nickel alloy excellent in corrosion resistance and high in brazing strength has come to be required to satisfy the requirement.

However, the nickel-chromium-boron-silicon alloy (for example, JIS Z 3265 BNi-2) widely used as the brazing nickel alloy has a problem that it is poor in corrosion resistance though high in brazing strength. As it is also poor in fluidity, corrosion in the vicinity of the boundary between the brazing filler metal and the parts to be brazed had come to be a problem.

JP 2000-171188 A discloses a plate type heat exchanger brazed with a brazing nickel-chromium-phosphorus alloy excellent in fluidity is disclosed. Also, in JP 2000-190069 A, a method for the preparation of a plate type heat exchanger by using a brazing nickel-chromium-phosphorus alloy is disclosed. However, BNi-7 prescribed in JIS standard as a typical brazing nickel-chromium-phosphorus alloy had problems that it was lower in brazing strength and poorer in corrosion resistance than other brazing nickel alloys.

An object of the present invention is to provide a plate type heat exchanger high in pressure resistance and excellent in corrosion resistance and a method for its preparation.

DISCLOSURE OF THE INVENTION

The plate type heat exchanger according to the present invention, in which contacting portions of laminated plural plates and fins or contacting portions of laminated plural plates are brazed to form a heat exchange area, is characterized in that at least the plate surface and the fin surface contacting to the fluid are covered by an alloy comprising in weight ration 25 to 35% chromium, 5 to 7% phosphorus, 3 to 5% silicon, 0.001 to 0.1% of at least one selected from the group consisting of aluminum, calcium, yttrium and mischmetal and balance of mainly nickel. The alloy may contain not more than 15% of iron and/or not more than 10% of molybdenum.

Also, a method for the preparation of the plate type heat exchanger according to the present invention high in workability is characterized in that a binder is applied by a spray coating on both or one of the plate and the fin and a brazing alloy powder consisting of the alloy mentioned above is adhered on said surface on which the binder was applied and then a plural of them is laminated and brazed.

When the nickel alloy according to the present invention is used as the brazing filler metal, a plate type heat exchanger of high pressure resistance can be obtained as it is high in brazing strength. Also, as it is excellent in fluidity, when it is melted during brazing, it flows on the surface of plates and fins constituting the heat exchanging portion and thus it can cover the plate surface and the fin surface contacting to the fluid. As the result, in the vicinity of the front of the flow of the brazing filler metal, corrosion caused by the corrosion potential difference between the brazing filler metal and the plates or the fins can be prevented.

Accordingly, the plate type heat exchanger according to the present invention can be applied for corrosive fluids, because the surfaces of plates and fins contacting to a fluid feared to corrode them are covered by the nickel alloy excellent in corrosion resistance.

Now, the reason for limiting the amounts of each components contained in the nickel alloy according to the present invention will be illustrated as follows.

Chromium is an element which forms a nickel-chromium solid solution by being dissolved in nickel and is necessary for improving corrosion resistance and oxidation resistance. However, a content lower than 25% gives little effect on the improvement of sulfuric acid resistance and strength, while a higher content lowers wettability. Therefore, it is made to be 25 to 35%.

Phosphorus in an amount lower than 5% raises the melting point of the alloy, while that in an amount higher than 7% deteriorates the corrosion resistance and lowers the strength. Hence, it is made to be 5 to 7%.

Silicon in an amount lower than 3% deteriorates the corrosion resistance and lowers the strength, while that in an amount higher than 5% raises the melting point. Therefore, it is made to be 3 to 5%.

Each of molybdenum and iron is an element effective for improving the strength of the alloy. However, higher contents give little effect for the improvement of strength and also deteriorate corrosion resistance. Hence, they are made to be respectively not more than 10% and not more than 15%.

Aluminum, calcium, yttrium and mischmetal are elements necessary for improving wettability. However, an amount lower than 0.001% gives little effect, while that higher than 0.1% lowers wettability and strength. Therefore, it is made to be 0.001 to 0.1%. Use of aluminum is particularly preferred.

Furthermore, in the nickel alloy used in the present invention, part of nickel may be replaced by cobalt. In this case, it is preferred that the used amount of cobalt is not higher than 10% of the alloy.

In the present invention, as the binder for adhering the brazing alloy powder to the plates and so, either an organic solvent type binder or an aqueous type binder can be used. However, it is preferred to use the aqueous type binder excellent in safety. Conventionally, the aqueous type binder has been generally poor in wettability and low in adhesion and therefore it has been difficult to adhere a brazing alloy powder surely on the part to be brazed. However, according to the present invention, the brazing filler metal can be fixed uniformly and surely by spray-coating the binder and then applying the brazing alloy powder on the surface coated by the binder in a method of scattering or the like. Resultantly, a rapid treatment is possible.

As the aqueous type binders, there are exemplified aqueous emulsions and aqueous solutions of vinyl acetate resins, polyvinyl alcohols, polyvinylpyrrolidones, polyacrylamides, polyethylene oxides, polyethylene glycols and the like.

In the present invention, to get excellent corrosion resistance and fluidity, it is preferred that the brazing is carried out in an atmosphere of vacuum lower than $10^{-3}$ torr or a nonoxidative atmosphere.

Also, when corrosion becomes a problem only in one of the fluids flowing in the heat exchanger, the surface of the plates and fins may be covered by the nickel alloy according to the present invention only on the side of the path in which said fluid flows.

The present invention can be applied to a heat exchanging portion constituted by laminating alternately plates and fins and brazing between the contacting portions of each plates and fins or for a heat exchanger constituted by forming spacers and uneven portions for stirring on the plate surface to omit the fins and brazing between the contacting portions of plates or for a heat exchanger constituted by inserting the fins for only one of the fluids and brazing between the contacting portions.

BEST EMBODIMENT FOR EXECUTING THE INVENTION

Figure 1:
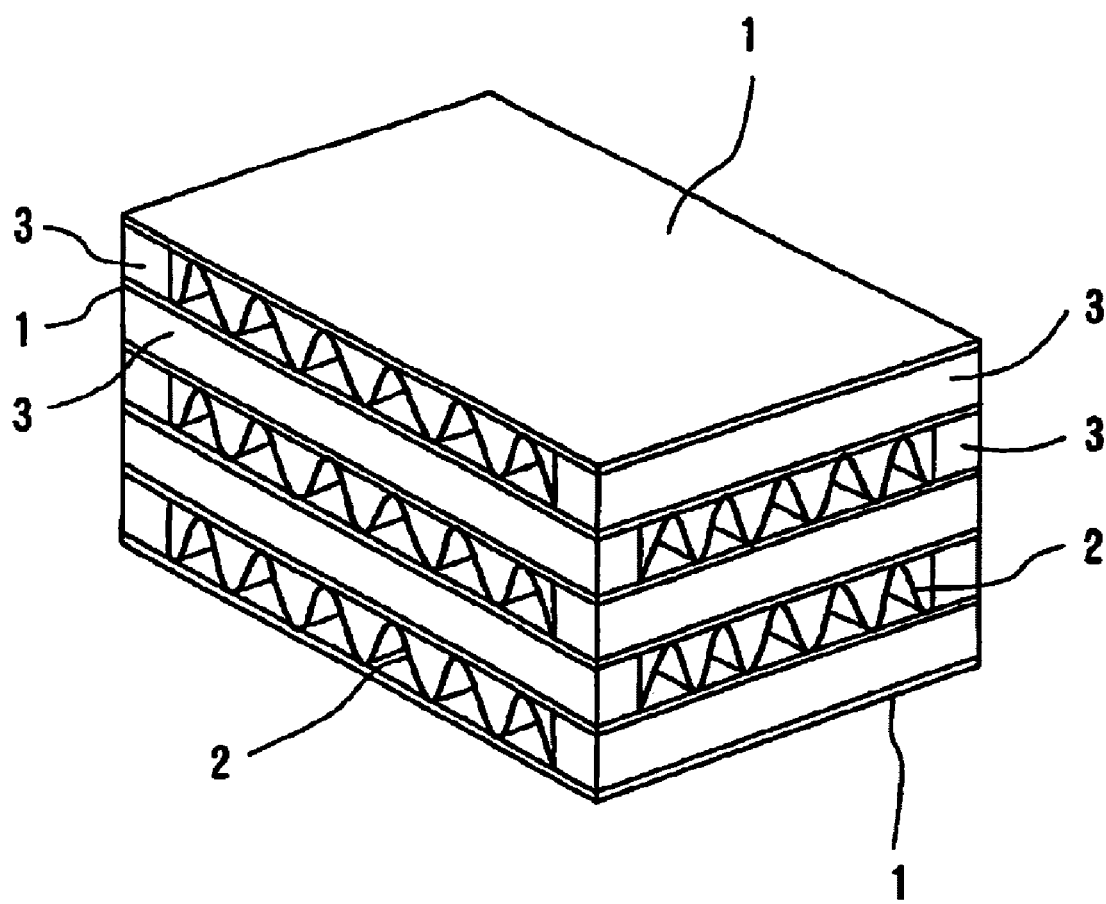
FIG. 1 is a view of the general construction showing the conditions of plates and fins in a plate type heat exchanger according to the present invention.

Examples of the present invention will be illustrated as follows.

In Examples, as shown in FIG. 1, a plate type heat exchanger constituted by laminating alternately plates and fins and brazing them was prepared by a method in which a brazing alloy powder was adhered to plates 1 and the plates were laminated with fins 2 and bars 3 to form a prescribed shape and then they were brazed.

EXAMPLE 1

An alloy A consisting of the components shown in Table 1 was melted and a brazing alloy powder was prepared by a gas atomizing method.

Then, a binder (aqueous polyvinyl alcohol solution) was sprayed on the both surfaces of plates 1 made of 304 stainless steel and then the brazing alloy powder prepared above was adhered on the binder and then successively these plates 1 were laminated with fins 2 and bars 3 and brazed in a vacuum of $10^{-4}$ torr at 1100° C. for 10 minutes to complete a plate type heat exchanger.

The completed heat exchanger was subjected to a burst test. The pressure resistance was 63 kg/cm$^2$. After the burst test, the heat exchanger was cut and the flow of the brazing filler metal was examined. It was found that the surfaces of the plates and the fins were coated with the brazing filler metal.

The alloy A was melted and molded in a shell mold and a test piece of 10×10×5 mm was prepared from it. The test piece was immersed in a 5% sulfuric acid solution to carry out a corrosion test. As the result, the corrosion loss was 0.0001 mg/m$^2$s.

EXAMPLE 2

An alloy B consisting of the components shown in Table 1 was melted and a brazing alloy powder was prepared by a gas atomizing method.

Then, in the same manner as in Example 1, the brazing alloy powder was adhered on plates made of 304 stainless steel and then they were laminated with fins and bars and brazed in a vacuum of $10^{-4}$ torr at 1090° C. for 10 minutes to complete a plate type heat exchanger.

The completed heat exchanger was subjected to a burst test. The pressure resistance was 59 kg/cm$^2$. After the burst test, the heat exchanger was cut and the flow of the brazing filler metal was checked. It was found that the surfaces of the plates and the fins were coated with the brazing filler metal.

A corrosion test was carried out on the alloy B in the same manner as in Example 1. As the result, the corrosion loss was 0.0003 mg/m$^2$s.

EXAMPLE 3

An alloy C consisting of the components shown in Table 1 was melted and a brazing alloy powder was prepared by a gas atomizing method.

Then, in the same manner as in Example 1 except that a polyvinyl acetate emulsion was used as the binder, the brazing alloy powder was adhered on plates made of 304 stainless steel and then they were laminated with fins and bars and brazed in a vacuum of $10^{-4}$ torr at 1080° C. for 10 minutes to complete a plate type heat exchanger.

The completed heat exchanger was subjected to a burst test. The pressure resistance was 61 kg/cm$^2$. After the burst test, the heat exchanger was cut and the flow of the brazing filler metal was examined. It was found that the surfaces of the plates and the fins were coated with the brazing filler metal.

A corrosion test was carried out on the alloy C in the same manner as in Example 1. As the result, the corrosion loss was 0.0002 mg/m$^2$s.

EXAMPLE 4

An alloy D consisting of the components shown in Table 1 was melted and a brazing alloy powder was prepared by a gas atomizing method.

Then, in the same manner as in Example 1 except that a polyvinyl acetate emulsion was used as the binder, the brazing alloy powder was adhered on plates made of 304 stainless steel and then they were laminated with fins and bars and brazed in a vacuum of $10^{-4}$ torr at 1080° C. for 10 minutes to complete a plate type heat exchanger.

The completed heat exchanger was subjected to a burst test. The pressure resistance was 58 kg/cm². After the burst test, the heat exchanger was cut and the flow of the brazing filler metal was examined. It was found that the surfaces of the plates and the fins were coated with the brazing filler metal.

A corrosion test was carried out on the alloy D in the same manner as in Example 1. As the result, the corrosion loss was 0.0003 mg/m²s.

EXAMPLE 5

An alloy E consisting of the components shown in Table 1 was melted and a brazing alloy powder was prepared by a gas atomizing method.

Then, in the same manner as in Example 1 except that a polyvinyl acetate emulsion was used as the binder, the brazing alloy powder was adhered on plates made of 304 stainless steel and then they were laminated with fins and bars and brazed in a vacuum of $10^{-4}$ torr at 1090° C. for 10 minutes to complete a plate type heat exchanger.

The completed heat exchanger was subjected to a burst test. The pressure resistance was 60 kg/cm². After the burst test, the heat exchanger was cut and the flow of the brazing filler metal was examined. It was found that the surfaces of the plates and the fins were coated with the brazing filler metal.

A corrosion test was carried out on the alloy E in the same manner as in Example 1. As the result, the corrosion loss was 0.0004 mg/m²s.

EXAMPLE 6

An alloy F consisting of the components shown in Table 1 was melted and a brazing alloy powder was prepared by a gas atomizing method.

Then, in the same manner as in Example 1 except that an aqueous polyvinylpyrrolidon solution was used as the binder, the brazing alloy powder was adhered on plates made of 304 stainless steel and then they were laminated with fins and bars and brazed in a vacuum of $10^{-4}$ torr at 1090° C. for 10 minutes to complete a plate type heat exchanger.

The completed heat exchanger was subjected to a burst test. The pressure resistance was 59 kg/cm². After the burst test, the heat exchanger was cut and the flow of the brazing filler metal was examined. It was found that the surfaces of the plates and the fins were coated with the brazing filler metal.

A corrosion test was carried out on the alloy F in the same manner as in Example 1. As the result, the corrosion loss was 0.0003 mg/m²s.

COMPARATIVE EXAMPLE 1

An alloy G consisting of the components shown in Table 1 was melted and a brazing alloy powder was prepared by a gas atomizing method.

Then, in the same manner as in Example 1 except that an aqueous polyvinylpyrrolidon solution was used as the binder, the brazing alloy powder was adhered on plates made of 304 stainless steel and then they were laminated with fins and bars and brazed in a vacuum of $10^{-4}$ torr at 1080° C. for 10 minutes to complete a plate type heat exchanger.

The completed heat exchanger was subjected to a burst test. The pressure resistance was 34 kg/cm². After the burst test, the heat exchanger was cut and the flow of the brazing filler metal was examined. It was found that the surfaces of the plates and the fins were coated with the brazing filler metal.

The alloy G was melted and a corrosion test was carried out on it in the same manner as in Example 1. As the result, the corrosion loss was 0.002 mg/m² s.

COMPARATIVE EXAMPLE 2

An alloy BNi-7 was melted and a brazing alloy powder was prepared by a gas atomizing method.

Then, in the same manner as in Example 1, the brazing alloy powder was adhered on plates made of 304 stainless steel and then they were laminated with fins and bars and brazed in a vacuum of $10^{-4}$ torr at 1080° C. for 10 minutes to complete a plate type heat exchanger.

The completed heat exchanger was subjected to a burst test. The pressure resistance was 31 kg/cm². After the burst test, the heat exchanger was cut and the flow of the brazing filler metal was examined. It was found that the surfaces of the plates and the fins were coated with the brazing filler metal.

The alloy BNi-7 was melted and a corrosion test was carried out on it in the same manner as in Example 1. As the result, the corrosion loss was 0.015 mg/m²s.

The test results of Examples 1 to 7 and Comparative Examples 1 and 2 are shown in Table 2 together with the materials used.

TABLE 1

| | Component ratio (weight %) | | | | | | | | |
|---|---|---|---|---|---|---|---|---|---|
| | Cr | P | Si | Al | Ca | Mo | Fe | Co | Ni |
| Alloy A | 29 | 6 | 4.5 | 0.03 | — | 3 | 7 | — | Balance |
| Alloy B | 28 | 6 | 4 | — | 0.02 | 5 | — | — | Balance |
| Alloy C | 29 | 6.1 | 4.3 | 0.02 | — | — | — | — | Balance |
| Alloy D | 30 | 6.2 | 4.5 | 0.03 | — | — | 8.1 | — | Balance |
| Alloy E | 29 | 5.8 | 4.5 | 0.02 | — | — | 1.2 | 8 | Balance |
| Alloy F | 28 | 6 | 4 | 0.002 | 0.02 | 5 | 0.1 | — | Balance |
| Alloy G | 24 | 9.5 | — | — | — | — | — | — | Balance |
| BNi-7 | 13 | 10 | — | — | — | — | — | — | Balance |

TABLE 2

| | Materials used | | Test result | |
|---|---|---|---|---|
| | | | Pressure resistance | Corrosion loss |
| | Alloy | Binder | (kg/cm²) | (mg/m²s) |
| Example 1 | Alloy A | Polyvinyl alcohol | 63 | 0.0001 |
| Example 2 | Alloy B | Polyvinyl alcohol | 59 | 0.0003 |
| Example 3 | Alloy C | Polyvinyl acetate | 61 | 0.0002 |
| Example 4 | Alloy D | Polyvinyl acetate | 58 | 0.0003 |
| Example 5 | Alloy E | Polyvinyl acetate | 60 | 0.0004 |
| Example 6 | Alloy F | Polyvinyl pyrrolidone | 59 | 0.0003 |
| Comp. Ex. 1 | Alloy G | Polyvinyl pyrrolidone | 34 | 0.002 |
| Comp. Ex. 2 | BNi-7 | Polyvinyl alcohol | 31 | 0.015 |

As shown above, the plate type heat exchangers prepared by Examples according to the present invention have come to be highly excellent in pressure resistance and corrosion resistance.

The indication % means weight % in the present specification unless specified.

What is claimed is:

1. A plate-type heat exchanger having laminated plural plates with brazed contacting portions to form a heat exchange area, comprising: at least a surface of a plate in contact with a fluid and covered with an alloy comprising 25 to 35 wt. % of chromium, 5 to 7 wt. % of phosphorus, 3 to 5 wt. % of silicon, 0.001 to 0.1 wt. % of aluminum and the balance containing mainly nickel.

2. The plate-type heat exchanger according to claim 1, in which said alloy contains iron in an amount not higher than 15%.

3. The plate-type heat exchanger according to claim 1, in which said alloy contains molybdenum in an amount not higher than 10%.

4. A method of preparing a plate-type heat exchanger having laminated plural plates and fins to form a heat exchange area, comprising the steps of: applying a binder on at least one of a plate and a fin by spray-coating; then adhering a brazing alloy powder consisting of a nickel alloy on a surface applied with the binder; and then repetitively laminating and heating to effect brazing, said brazing alloy comprising 25 to 35 wt. % of chromium, 5 to 7 wt. % of phosphorus, 3 to 5 wt. % of silicon, 0.001 to 0.1 wt. % of aluminum and the balance containing mainly nickel.

5. A plate-type heat exchanger having laminated plural plates with brazed contacting portions to form a heat exchange area, comprising: at least a surface of a plate in contact with a fluid and covered with an alloy comprising 25 to 35 wt. % of chromium, 5 to 7 wt. % of phosphorus, 3 to 5 wt. % of silicon, 0.001 to 0.1 wt. % of calcium and the balance containing mainly nickel.

6. The plate-type heat exchanger according to claim 5, in which said alloy contains iron in an amount not higher than 15%.

7. The plate-type heat exchanger according to claim 5, in which said alloy contains molybdenum in an amount not higher than 10%.

8. A method of preparing a plate-type heat exchanger having laminated plural plates and fins to form a heat exchange area, comprising the steps of: applying a binder on at least one of a plate and a fin by spray-coating; then adhering a brazing alloy powder consisting of a nickel alloy on a surface applied with the binder; and then repetitively laminating and heating to effect brazing, said brazing alloy comprising 25 to 35 wt. % of chromium, 5 to 7 wt. % of phosphorus, 3 to 5 wt. % of silicon, 0.001 to 0.1 wt. % of calcium and the balance containing mainly nickel.

\* \* \* \* \*

UNITED STATES PATENT AND TRADEMARK OFFICE
CERTIFICATE OF CORRECTION

PATENT NO. : 7,179,540 B2  
APPLICATION NO. : 10/451618  
DATED : February 20, 2007  
INVENTOR(S) : Kaoru Tada It is certified that error appears in the above-identified patent and that said Letters Patent is hereby corrected as shown below:

Title Page; item (73);  
Please correct the name of the Assignee to read as follows:

-- Fukuda Metal Foil & Powder Co., Ltd. --

The change is to correct "Power" to -- Powder -- which now includes the letter "d".

Signed and Sealed this

Sixth Day of November, 2007

JON W. DUDAS  
*Director of the United States Patent and Trademark Office*

(12) INTER PARTES REEXAMINATION CERTIFICATE (0073rd)
United States Patent
Tada

(10) Number: US 7,179,540 C1
(45) Certificate Issued: Jun. 9, 2009

(54) PLATE TYPE HEAT EXCHANGER AND METHOD FOR MANUFACTURE THEREOF

(75) Inventor: Kaoru Tada, Isehara (JP)

(73) Assignees: Brazing Co., Ltd., Isehara-Shi, Kanagawa (JP); Fukuda Metal Foil & Powder Co., Ltd., Matsubaradori-Muromachi, Nishiiru, Shimogyo-Ku, Kyoto-Shi, Kyoto (JP)

Reexamination Request:
No. 95/000,364, Jun. 23, 2008

Reexamination Certificate for:
Patent No.: 7,179,540
Issued: Feb. 20, 2007
Appl. No.: 10/451,618
Filed: Jun. 20, 2003

Certificate of Correction issued Nov. 6, 2007.

(22) PCT Filed: Dec. 6, 2001
(86) PCT No.: PCT/JP01/10707

§ 371 (c)(1),
(2), (4) Date: Jun. 20, 2003

(87) PCT Pub. No.: WO02/053318

PCT Pub. Date: Jul. 11, 2002

(30) Foreign Application Priority Data

Dec. 28, 2000 (JP) ...................... 2000-404993

(51) Int. Cl.
*B23K 35/30* (2006.01)
*C22C 19/05* (2006.01)
*F28F 21/08* (2006.01)

(52) U.S. Cl. ............ 428/679; 165/90; 228/262.42; 228/248.1; 420/443; 420/445; 428/680; 428/685

(58) Field of Classification Search ................ None
See application file for complete search history.

(56) References Cited

U.S. PATENT DOCUMENTS 3,941,588 A  3/1976 Dremann
4,522,859 A  6/1985 Blair

FOREIGN PATENT DOCUMENTS

JP  9225679  9/1977

OTHER PUBLICATIONS

Publication: Chromium Metal: Comsumptions & Fields of Application by Robert W. Bebbington, London & Scandinavian Metallurgical Co. Ltd., May 6–8, 1990.
Publication: Chromium by K. Pile date unknown.
Publication: NRDC—Electrolytic Chromium Metal (www.nrdcindia.com), Apr. 30, 2001.
Publication: Jan. 4, 1997, Version of www.jmcusa.com.

*Primary Examiner*—Krisanne Jastrzab

(57) ABSTRACT

A plate type heat exchanger wherein contacting portions of laminated plural plates and fins or contacting portions of laminated plural plates are brazed to form a heat exchange area, characterized in that at least the surface of a plate or fin contacting with a fluid is covered with an alloy comprising in weight ratio 25-35% of chromium, 5-7% of phosphorus, 3-5% of silicon, 0.001-0.1% of at least one selected from the group consisting of aluminum, calcium yttrium and mischmetal, and balance containing mainly nickel. The alloy may contain 15% or less of iron and or 10% or less of molybdenum.

The plate type exchanger exhibits enhanced pressure resistance and is excellent in corrosion resistance.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claim 1–4 are cancelled.

Claim 5–8 were not reexamined.

\* \* \* \* \*